United States Patent [19]

Myers et al.

[11] Patent Number: 4,945,858
[45] Date of Patent: Aug. 7, 1990

[54] SANITARY ANIMAL STALL

[76] Inventors: William F. Myers, 202 Cedar La., Channelview, Tex. 77530; Robert E. Myers, 18507 Prince William La., Nassau Bay, Tex. 77058

[21] Appl. No.: 236,388

[22] Filed: Aug. 25, 1988

[51] Int. Cl.$^5$ .............................................. A01K 1/015
[52] U.S. Cl. ........................................ 119/28; 404/32; 404/35; 52/664
[58] Field of Search ...................... 119/28, 27; 52/660, 52/318, 664, 388, 477, 475; 404/32, 35, 45

[56] References Cited

U.S. PATENT DOCUMENTS

| 1,179,088 | 4/1916 | Geiger | 52/318 |
|---|---|---|---|
| 3,557,669 | 1/1971 | Fenton | 404/45 |
| 4,235,197 | 11/1980 | Curtis et al. | 119/28 |

FOREIGN PATENT DOCUMENTS

| 211054 | 7/1984 | Fed. Rep. of Germany | 119/28 |
|---|---|---|---|
| 579343 | 9/1976 | Switzerland | 119/28 |
| 2037851 | 7/1980 | United Kingdom | 119/28 |

Primary Examiner—John Weiss
Attorney, Agent, or Firm—Sughrue, Mion, Zinn, Macpeak & Seas

[57] ABSTRACT

A compression molded fiberglass reinforced resin grating formed of laterally spaced intersecting load bearing bars and cross bars is partially embedded within a layer of sand overlying the floor material of an animal stall defined by a vertical wall enclosure. At least the load bearing bars of the grating have flat top and bottom surfaces with opposite oblique sidewalls which taper towards each other from the bottom to the top. When embedded in the sand with the flat top surfaces exposed, the tapered load bearing bars resist downward movement into the sand layer due to the wider flat bottoms of the load bearing bars. Sand captured between opposed oppositely oblique walls of adjacent load bearing bars is solidly packed therebetween forming with the load bearing bars and the cross bars a solid mass to further resist downward movement, while permitting drainage of liquid waste therethrough. Soiled bedding may be removed from the top of the embedded grating by shoveling.

2 Claims, 1 Drawing Sheet

SANITARY ANIMAL STALL

FIELD OF THE INVENTION

This invention relates to flooring structures for animals and more particularly, to an improved animal stall utilizing a compression molded fiberglass reinforced resin grating flush embedded in a layer of sand to facilitate periodic removing of solid animal waste, while permitting drainage of liquid waste.

BACKGROUND OF THE INVENTION

Animal stalls for horses, cattle, etc. pose particular problems, since the liquid and solid waste excrement by the animal must be periodically removed. Additionally, since the stalls are areas where the animals bed down, provisions must be made for providing some comfort to the animals. Conventionally, straw or wood chips are employed as bedding, however, straw is becoming relatively expensive and a regular supply is difficult to obtain. Since the straw or other bedding once soiled requires periodic removal, attempts have been made to create a better stall flooring which permits the soiled bedding to be readily removed, permits the draining of urine, and which maximizes the comfort of the animal.

The flooring within the barn or other building housing the animal in individual or stall known as "cubicles" or "cow-kennel" is typically in the past, dirt or a mud floor. Attempts have been made to employ wooden grating or the like overlying the mud floor so that the standing animal may defecate and/or urinate directly through the wooden grating. Unfortunately, mud floors (without grating) locally leaves holes which require constant attention, since the urine collects and cannot be easily disposed of. Irrespective of the nature of the flooring, bedding such as straw is required to some extent.

Attempts in improving such animal flooring structures are evidenced by U.S. Pat. Nos. 3,662,715; 3,718,119; 4,208,279; 4,235,197; 4,338,369; and 4,364,331.

A number of these patents utilize some type of surface decking, partially embedded in sand or gravel so as to support the animals, yet provide a permeable support so that the urine can drain through the sand, gravel, or both, thereby facilitating its removal, while permitting the solids portions of the waste to be removed by shovels or the like passing over the exposed top of the surface decking.

Such floor systems, however, as constructed in the past, are expensive, with surface decking formed of metal such as sheet steel having apertures or openings therein, or of molded plastic decking sections are not only expensive, but tend to flex or bend locally under the loads imposed by the animal, and impair the removal of the solids waste, or the soiled bedding such as straw, wood chips, or the like.

It is therefore an object of the present invention to provide an improved animal stall in which the stall retains the bedding in a more sanitary condition for a longer period of time, permits faster clean up of soiled bedding, provides better footing for the animal, and a more comfortable bed for the animal housed therein.

DESCRIPTION OF THE PREFERRED EMBODIMENT

Figure 1:
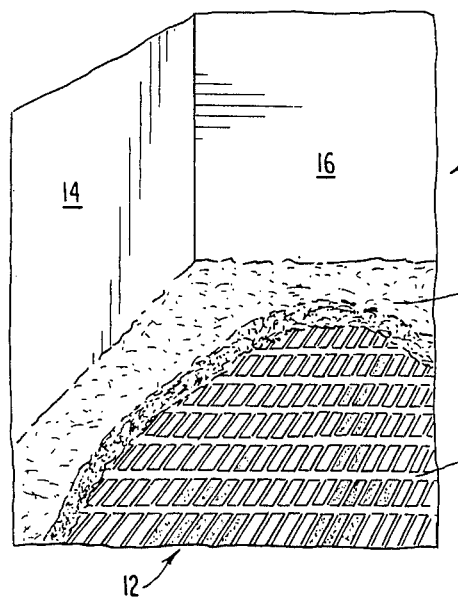
FIG. 1 is a perspective view of an animal stall forming a preferred embodiment of the invention, with the bedding partially scraped away to show the compression molded fiberglass reinforced resin grating forming a principal component of the floor structure thereof.

Referring to the drawings, in FIG. 1, an animal stall indicated generally at 10 is partially defined by vertical walls such as laterally opposed sidewalls, on: of which is illustrated at 14, and a front and rear wall, with the rear wall 16, as illustrated, intersecting sidewall 14 at right angles thereto. The stall 10 which may be rectangular in plan form is provided with a layer of bedding as at 20 formed of wood chips, straw, or the like, supported by an underlying perforated, compression molded fiberglass reinforced molded resin grating 18 and forming the major element of the floor structure indicated generally at 12.

Figure 2:
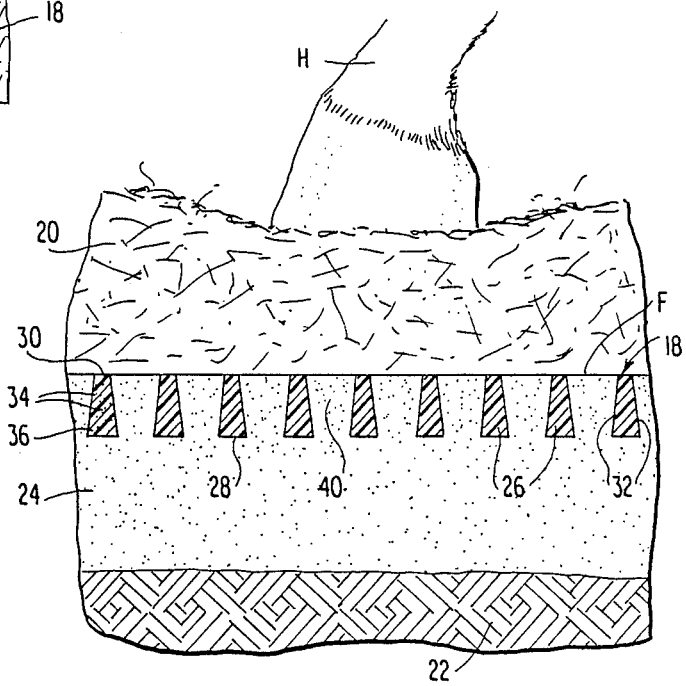
FIG. 2 is vertical sectional view of a portion of the animal stall of FIG. 1.

As seen better in FIG. 2, the stall 10 which may form a portion of a barn or like covered building has an earth or gravel floor 22, over which is placed a layer of sand 24 which may be more than a foot in vertical height and through which the urine from the animal may readily percolate. Important to the present invention is the positioning and the partial embedding of the compression molded fiberglass reinforced grating 18 in the layer of sand 24 upon which the bedding 20 rests.

Figure 3:
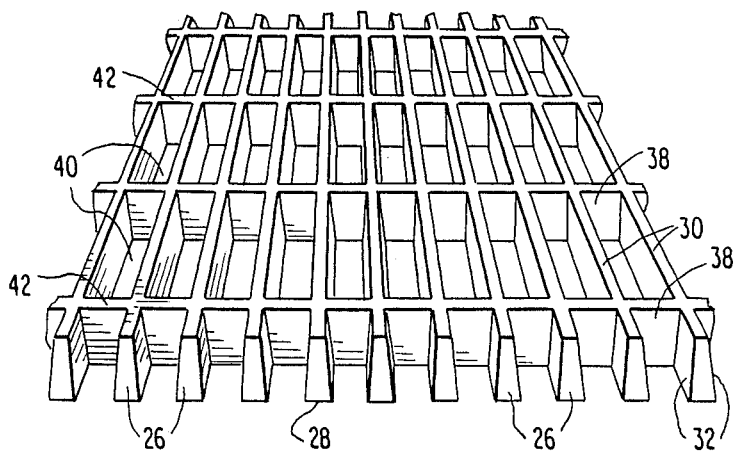
FIG. 3 is an enlarged, perspective view of a portion of the grating employed in the animal stall of FIGS. 1 and 2.

The compression molded fiberglass reinforced resin grating 18 is commercially manufactured under the method of U.S. Pat. No. 3,772,122, issued Nov. 13, 1973, and assigned to the common corporate assignee and sold under the registered trademark "KORDEK". As such, as shown in FIGS. 2 and 3, grating 18 is composed of laterally spaced, longitudinally extending compression molded load fiberglass reinforced resin bearing bars 26 which intersect right angle, integrally molded fiberglass reinforced cross bars 38 and which define therebetween elongated rectangular openings or holes 40. In FIG. 2, the cross section of the load bearing bars 26 shows the occurrence of the fiberglass strands or filaments 34 embedded in solid resin 36 under the compression molding process of U.S. Pat. No. 3,772,126. Important to the claimed invention is the configuration given to the load bearing bars 26 which have a flat bottom surface 28, a flat top surface 30, and slightly oblique, upwardly converging opposite sidewalls 32. As a result, the openings between the laterally spaced longitudinally extending load bearing bars 26 taper downwardly and away from each other to opposite sides from the floor level F defined by the tops 30 of the grating load bearing bars 26. As indicated in FIG. 3, the cross bars 38 are of rectangular form in cross section, have their upper surfaces or tops 42 flush with the tops 30 of the load bearing bars 26, and preferably the cross bars are of the same vertical height as the load bearing bars 26. With the load bearing bars 26 of frustro pyramidal cross section, and with the wider bottoms 28 thereof facing downwardly and partially embedded within the sand 24, with the exception of their upper surfaces or tops 30, any action tending to force the sand downwardly into the openings or holes 40 between the load bearing bars tends to compact the sand very densely between the opposing sidewalls 32 of laterally adjacent load bearing bars 26. This action renders the grating practically immovable, irrespective of forces applied thereto by movement of the animal such as the horse H whose foot is depicted in FIG. 2 providing local loads on given numbers of the grating load bearing bars 26. By near fully embedding the compression molded fiberglass reinforced resin grating 18 in the sand, significant resistance to further movement of the grating 18 within the mass of sand 24 is effected due to the configuration of the load bearing bars 26 and the dense compaction of sand within the openings 40. However, unlike steel grating, the fiberglass reinforced compressive molded grating 18 is capable of slight deflection, but being resilient returns to its original shape. Thus, the grating panel or section absorbs any impact and returns undamaged to its original flat shape. The grid openings or holes 40 allow waste to percolate in a more uniform and rapid manner through sand 24, thereby permitting adjacent bedding to remain dry, the soiled bedding 20 may be periodically removed by driving a shovel across the floor F defined by the tops 30 of the grating load bearing bars 26 and the tops 42 of the cross bars 38. The delta shape of the load bearing bars 26 lock into the sand 24 which produces a solid support with slight flexibility.

It is highly desirable to provide some resilience to the floor structure 12, since such occurs in natural range, under the animals' feet, and to provide insulation of the animals from their own waste, while facilitating the drainage of the liquid waste which may be effected by aspects within the patents cited above, particularly U.S. Pat. 3,662,715. The animals in standing or rolling on the floor F will not deform the supporting grid provided by grating 18 or cause it to shift within the sand layer 24.

The deck, constructed by the grating 18 partially embedded in the sand 24, has improved structural strength, since the compressed fiberglass fibers within the compression molded load bearing bars 26 and cross bars 38 allow the floor F to deflect slightly without permanently deforming. While percolating the liquid waste, the floor will not dispose of solid waste, which for animals such as horses, cattle, amounts to about 20% of the total, however, the residue of solid material can be removed with the soiled bedding by an acceptable shoveling process over the flooring structure 12 in accordance with the invention herein.

While a single specific embodiment of the invention has been described and illustrated, it will be clear that variations of the details of construction which are specifically illustrated and described may be resorted to without departing from the true spirit and scope of the invention as defined by the following claims.

What is claimed is:

1. In a floor structure of an animal stall comprising: a vertical wall enclosure, an underlying base floor within said wall enclosure, a layer of sand overlying the base floor, and apertured surface decking overlying said sand and partially embedded therein, the improvement wherein:

said surface decking consists of molded plastic grating formed of laterally spaced, intersecting load bearing bars and cross bars, each having a flat top and bottom surface and opposed sidewalls, and wherein at least each of said load bearing bars have opposite oblique sidewalls thereof tapering towards each other from the bottom to the top, said flat bottom surface being wider than said flat top surface such when embedded in the sand, the wider bottom surfaces of said load bearing bars resists grating movement downwardly within the sand, while contact by the animals with the sand captured within the openings between the load bearing bars solidly pack the sand between opposing oppositely oblique sidewalls of adjacent load bearing bars to further resist downward penetration of said decking into the sand.

2. The floor structure for an animal stall as claimed in claim 1, wherein said grating is a fiberglass reinforced compression molded plastic grating permitting limited deflection under load to provide resilience under the feet of the animals occupying the stall similar to that of the animals' natural range.

* * * * *